July 25, 1933.  A. N. BECKER  1,919,269
GARAGE
Filed Sept. 28, 1927   6 Sheets-Sheet 1

Inventor
Alfonse N. Becker
by Henry Blech
Attorney

July 25, 1933.  A. N. BECKER  1,919,269
GARAGE
Filed Sept. 28, 1927   6 Sheets-Sheet 2

Inventor
Alfonse N. Becker
by Henry Blech
Attorney.

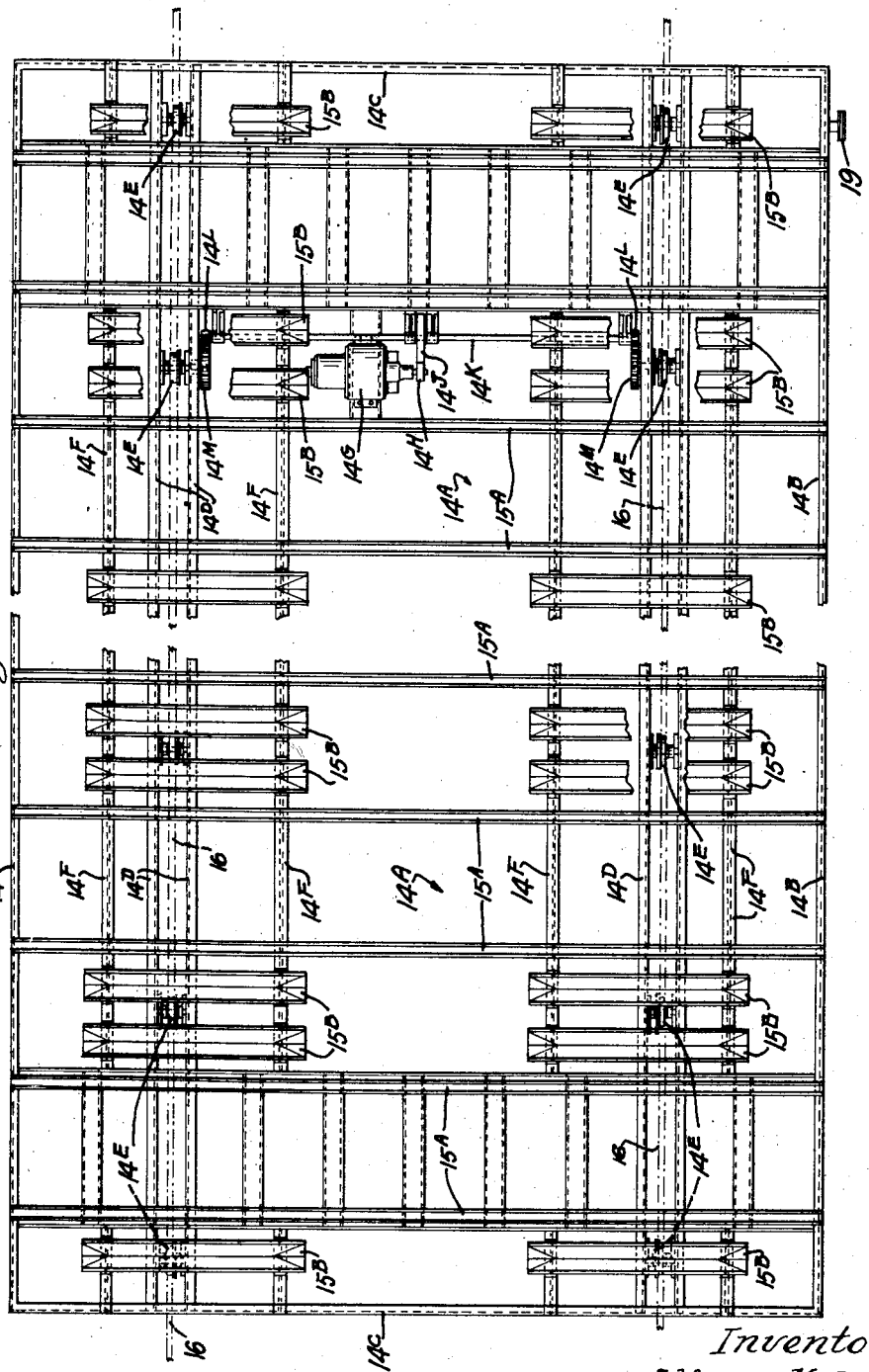

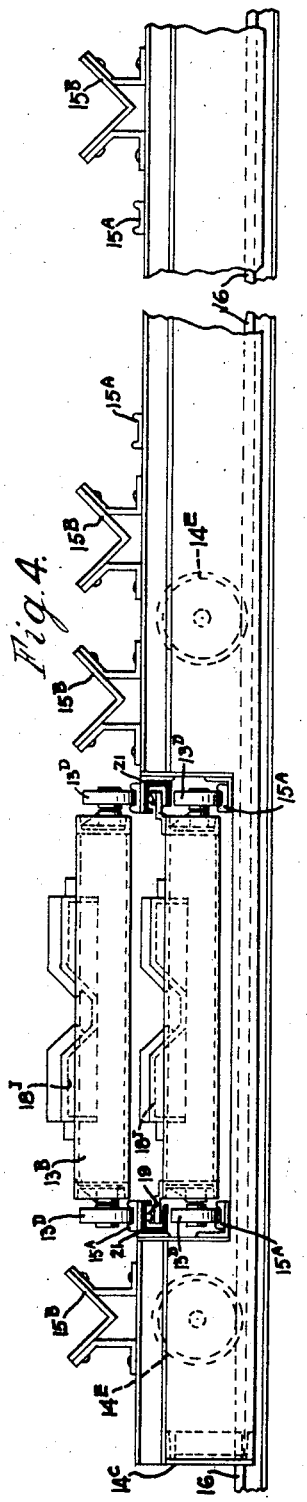
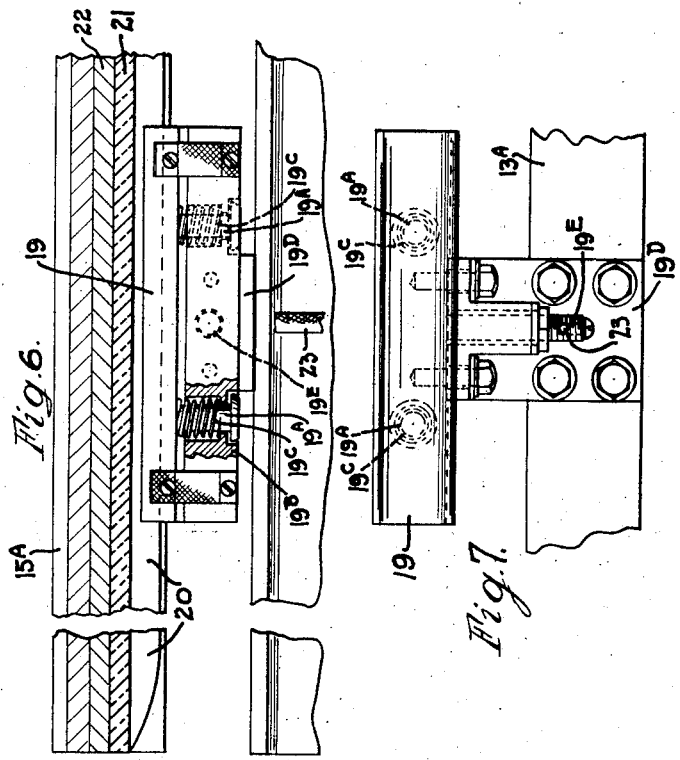
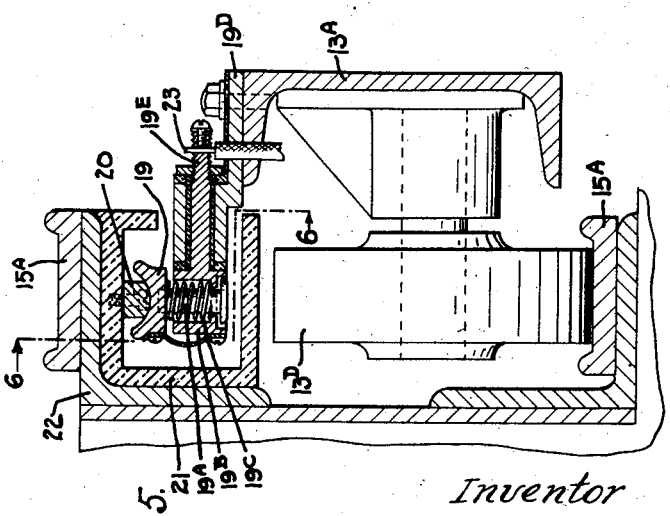

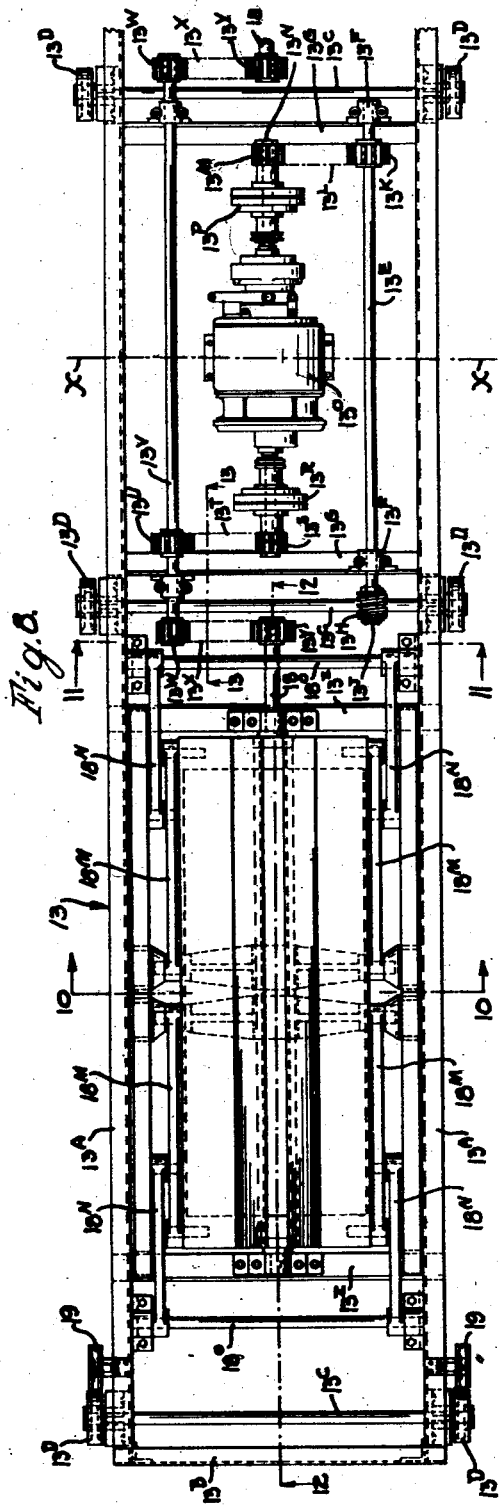

July 25, 1933.   A. N. BECKER   1,919,269
GARAGE
Filed Sept. 28, 1927   6 Sheets-Sheet 6
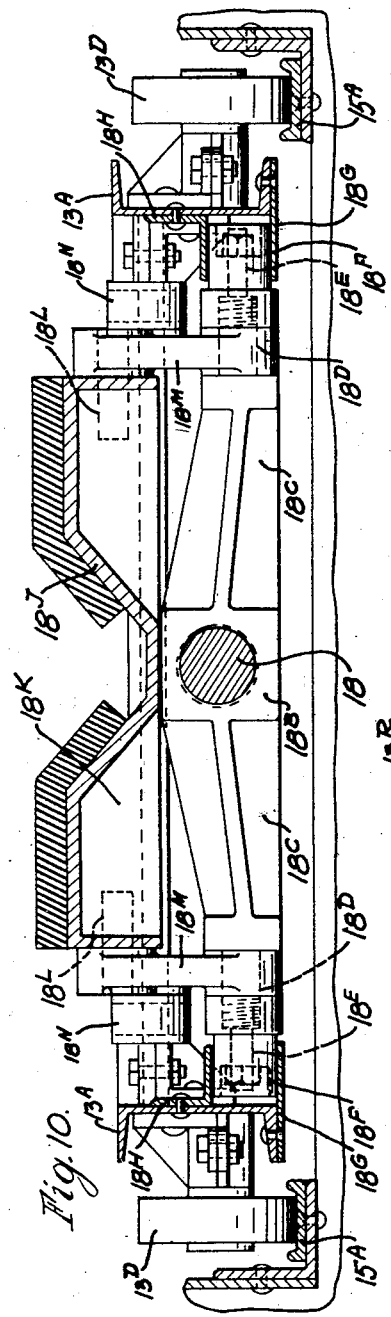
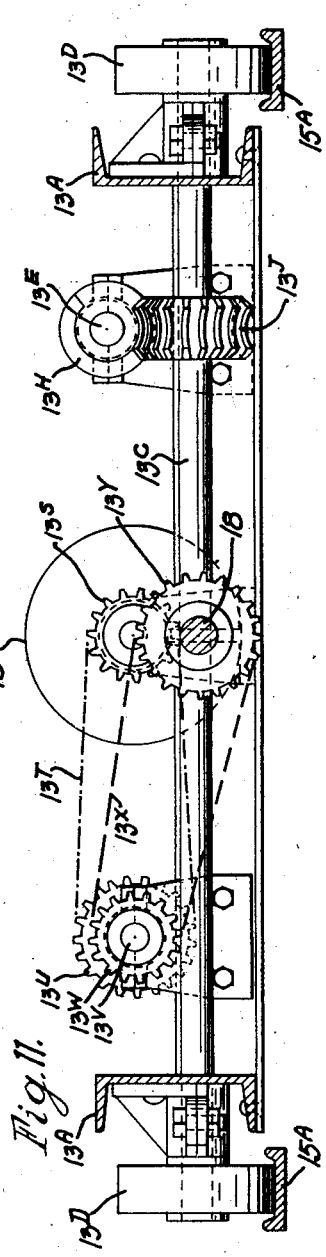
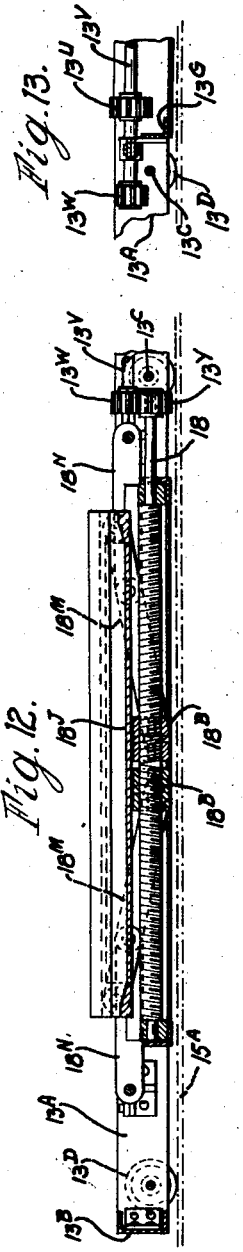
Inventor
Alfonse N. Becker
by Henry Blech
Attorney.

Patented July 25, 1933

1,919,269

UNITED STATES PATENT OFFICE

ALFONSE N. BECKER, OF MILWAUKEE, WISCONSIN, ASSIGNOR, BY MESNE ASSIGNMENTS, TO AUTOMATIC PARKING SYSTEMS, INC., A CORPORATION OF ILLINOIS

GARAGE

Application filed September 28, 1927. Serial No. 222,475.

This invention relates generally to improvements in garages, but has particular reference to improvements in multifloor garages where it is desirable to store motor vehicles in storage compartments on several superposed floors.

An important object of the invention is to provide facilities for elevating a motor vehicle to a predetermined floor, thence transferring the vehicle to a transfer table for lateral movement to a predetermined storage compartment and thereafter engaging said vehicle by a carrier mechanism on the transfer table to move the vehicle into the storage compartment.

Another object of my invention is to provide a mechanism on the elevating means or elevator for bodily lifting the motor vehicle thereon and then moving such mechanism with the elevated vehicle thereon onto a transfer table.

A further object of my invention is to arrange the carrier mechanism on the transfer table to elevate the motor vehicle preceding its lateral movement into a storage compartment to deposit the vehicle by lowering the vehicle into a support therein, and thence return to normal position on the transfer table.

A still further object of the invention is to provide a transfer table with a plurality of storage compartments thereon and with a vehicle transferring and reclaiming carriage at each end of such storage compartments thereon.

With the above and other objects in view, my invention consists in the novel combination and construction of the parts and members shown in my preferred embodiment by the attached drawings and particularly pointed out in the appended claims.

Referring to the drawings wherein like reference characters indicate like or corresponding parts:—

Fig. 3 is a plan view of the transfer table showing the propelling motor drive therefor, and loading and unloading ends with storage facilities or supports between the loading and unloading ends. It will be noted that the lines in the mid section are broken as the number of storage compartments thereon may vary.

Fig. 4 is a side elevation of the transfer table showing several of the intermediate storage supports thereon and one of the end loading and unloading spaces with end views of the transfer carriers. The lower carrier being the one on the transfer table and the upper carrier being the elevator transfer carrier but here shown in its position on the transfer table. Both carriers are shown with the vehicle lifting mechanism in lowered position.

Fig. 5 is a cross section showing an enlarged detail of one of the upper and lower transfer carrier tracks and particularly showing the roller on the transfer table carrier and its electric trolley shoe and current conductor.

Fig. 6 is a section taken on line 6—6 of Fig. 5, showing an elevation of the trolley shoe.

Fig. 7 is a plan view of the trolley shoe and its connection to the carrier channel frame.

Fig. 8 is a plan view of one end of one of the transfer carriers.

Fig. 9 is a side elevation of the end portion of one of the transfer carriers showing one of the vehicle lifting mechanisms; the dotted lines showing its elevated position.

Fig. 10 is an enlarged cross section taken on line 10—10 of Figs. 8 and 9, illustrating the elevating mechanism in its lowered position.

Fig. 11 is an enlarged cross section taken on line 11—11 of Fig. 8, illustrating the drive mechanism for the elevating mechanism.

Fig. 12 is a longitudinal cross section through the lifting or elevating mechanism taken on line 12—12 of Fig. 8.

Fig. 13 is a section taken on line 13—13 of Fig. 8, showing the end of one of the drive shafts and sprockets for transmitting power from the carrier motor to the elevating mechanism.

Figure 14:
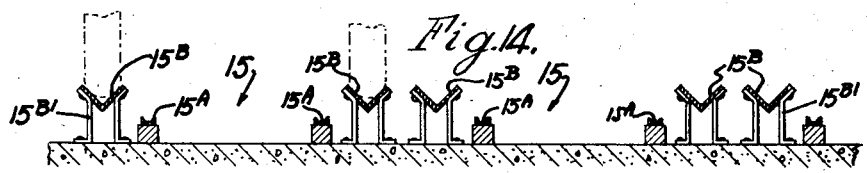
Figure 2:
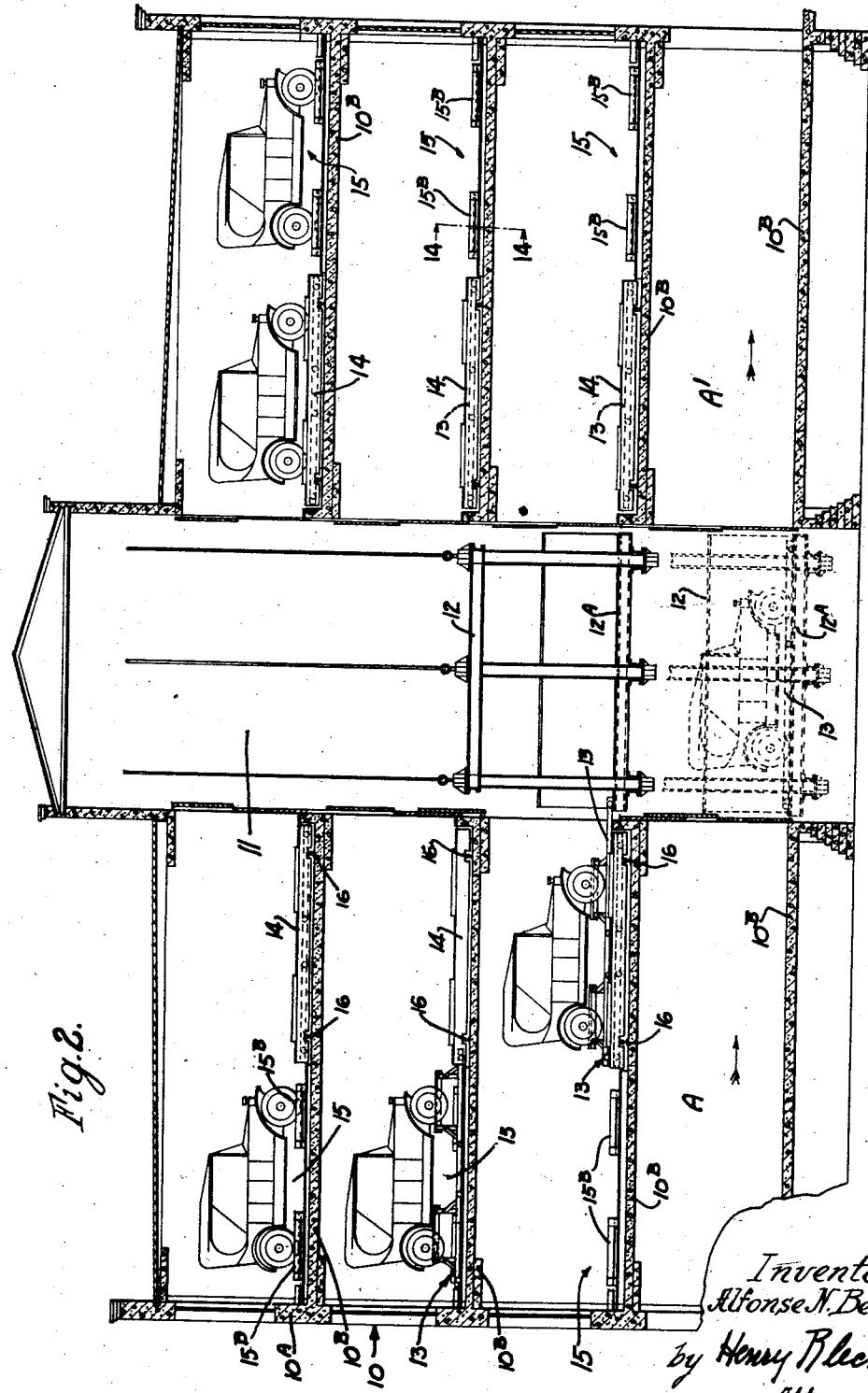
Fig. 2 is a vertical section through a garage showing the application of my invention to a plurality of superposed floors.

Fig. 14 is a cross section taken on line 14—14 of Fig. 2, showing the elevated supports in the storage compartments.

Figure 15:
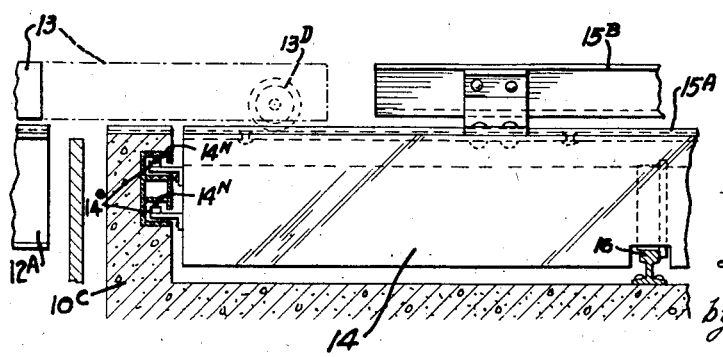

Fig. 15 is a cross section taken through the transfer table floor at the elevator showing portions of the transfer table floor and elevator and elevator transfer carrier in dotted lines entering the transfer table. The view also shows diagrammatically the electric current conductors and trolley for the transfer table.

Referring now in more detail to the several illustrations 10 indicates a garage structure having side walls 10$^A$ and floors 10$^B$. In this particular example, a pair of elevator shafts 11 is provided approximately located in the center of the building 10.

Vertically movable elevators 12 of any suitable design or construction are provided in the shafts 11.

On the platform 12$^A$ of each elevator 12, I provide a reciprocable carriage or carrier 13. Each elevator 12 is also provided with a pair of troughs 12$^B$ of any suitable design which guide the motor vehicle in its entrance onto the platform 12$^A$ for proper positioning over the transfer carriage or carrier 13.

Since the design, construction and operation of the carriers 13 on the elevators 12 is similar to the carriers on the transfer table 14 about to be described, detailed description may here be omitted.

The purpose of the transfer carriers 13 on the elevators 12, is to move the vehicles from the elevators onto the transfer tables 14 and from the transfer tables 14 onto the elevators 12 in reclaiming operation.

The function of the transfer table 14 is to laterally carry or move the vehicles toward a predetermined storage compartment 15.

Figure 1:
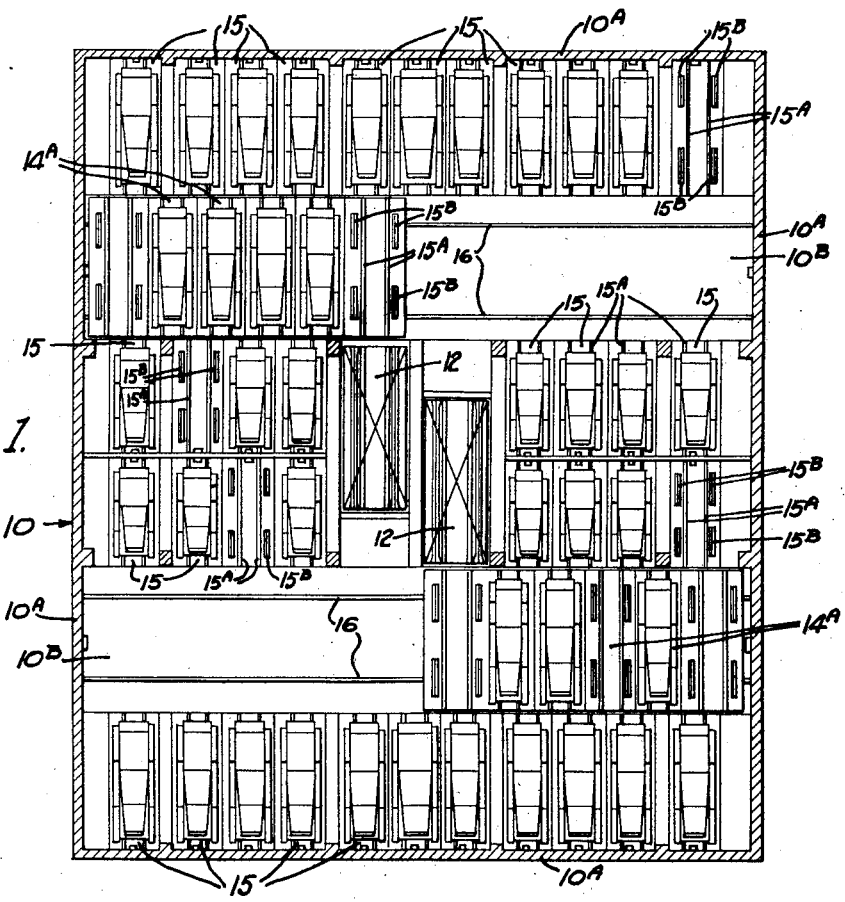
Fig. 1 is a diagrammatic plan view of a floor of a garage embodying my invention.

Referring now particularly to Figs. 1 and 2, each elevator 12, in this particular arrangement is situated to co-operate with a transfer table 14 which travels transversely to the discharge of the cars from the elevator and each transfer table 14 includes a suitable structural platform arranged to carry a transfer carrier mechanism 13 at each end with storage compartments or spaces 14$^A$ between the end carriers 13. Tracks 16 are provided for the transfer tables 14. The elevators 12 being located in center of the building, one end transfer carrier 13 is adapted to receive the motor vehicles from the elevator and discharge and reclaim same into and from the storage compartments 15 on either side of the tracks 16 located on one side of the center line of the building passing between the two elevators while the other end transfer carrier is adapted to store and reclaim the motor vehicles on the other side of the building center line and on either side of the track way 16.

The storage compartments 15 are provided with suitable channel tracks 15$^A$ as guides for the transfer carriers 13. Each compartment 15 is also provided with two pairs of elevated supports 15$^B$ for the motor vehicle wheels.

Referring now to Fig. 2, the ground floor is indicated by character A. The elevator 12 shown in dotted lines has just received an automobile through the left hand entrance side. When the automobile is brought down from storage it is discharged into the right hand bay A' for passage to the street in the direction of indicating arrow.

The elevator 12 indicated in full lines is in register with the second floor, and is shown with its carrier 13 in position with the automobile over the transfer table 14 ready to lower the automobile upon the wheel support thereon after which, the elevator carrier 13 is then withdrawn onto the elevator 12.

The left-hand bay on the third floor shows the transfer table 14 with its carrier 13 passed into a storage compartment with the automobile still in elevated position and ready to be lowered onto the two pairs of wheel supports 15$^B$. The left-hand bay on the fourth floor shows an automobile in a storage compartment 15 with the wheels thereof supported on the supports 15$^B$.

On the fourth floor of the right-hand bay is shown an automobile in one of the storage compartments and another automobile on the transfer table 14.

Referring to Fig. 14, the storage compartment wheel supports 15$^B$ are shown of steel of angular cross-section with supports 15$^{B1}$ which retain same in fixed elevated position above the carrier tracks 15$^A$.

Referring now to Fig. 3, the transfer table 14 comprises a structural platform of side members 14$^B$ and end members 14$^C$ with longitudinal members 14$^D$ carrying rollers or wheels 14$^E$ which ride on the tracks 16. The motor vehicle wheel supports of V cross-section 15$^B$ are similar in construction to those above described for the storage compartments, like-wise, the channel carrier guides or tracks 15$^A$. Suitable framing members 14$^F$ support the wheel supports 15$^B$.

The motor drive mechanism for the transfer table 14 consists of an electric motor 14$^G$ having a pinion 14$^H$ which is in mesh with a gear 14$^J$ rigidly mounted on the shaft 14$^K$. On the ends of the shaft 14$^K$ are pinions 14$^L$ which mesh with gears 14$^M$. The gears 14$^M$ are rigidly mounted to the short shafts of the wheels 14$^E$. The motor 14$^G$ is of reversible type for propelling the platform 14 on the tracks 16, and receives current from a pair of conductors 14$^N$ housed within the wall 10$^C$ through the contact shoes 14$^O$ on the platform 14. The operator's space on the transfer platform 14 may be provided by reserving one of the storage compartments 14$^A$ or may be remote control.

The transfer carriers 13 are of similar design and one of them is illustrated in detail in Figs. 8, 9, 10, 11, 12 and 13.

Fig. 8, shows a plan view of one-half of a carrier 13, which is symmetrical about the center line X—X, and which consists of channel structural sides 13$^A$ with end cross members 13$^B$. Suitable shafts 13$^C$ with wheels 13$^D$ at their ends are provided which are arranged to travel in the tracks 15^A. The travel or movement of the carriers 13 is secured through a drive shaft 13^E which is supported in bearings 13^F on the structural cross members 13^G. The worm 13^H is mounted to mesh with the worm gear 13^J rigidly mounted to the wheel shaft 13^C and the other end of the shaft 13^E is provided with a sprocket 13^K which is driven by a chain 13^L which is trained over the sprocket 13^M on one end of the shaft 13^N.

The shaft 13^N is an extension of the shaft of the motor 13^O which is equipped with a magnetic brake and which supplies power to the sprocket 13^M through an automatic magnetic clutch 13^P controlled by the operator.

The motor 13^O being reversible, the carriers may obviously move forward or backward through controls provided for the operator.

The other end of the shaft of the motor 13^O is also provided with a magnetic clutch 13^R for controlling the operation of the sprocket 13^S which is connected by the drive chain 13^T to a sprocket 13^U on the shaft 13^V which is supported in bearings on the cross members 13^G.

Suitable sprockets 13^W are provided at each end of the shaft 13^V for the chain drives 13^X which transmit power to the sprockets 13^Y on the shafts 18.

The lifting mechanisms for the motor vehicles provided at each end of the carriers 13, are alike, and one of same is shown in the plan view of Fig. 8, and includes a drive shaft 18 which is supported in suitable bearings 18^A on the cross members 13^Z. The section of the shaft 18 between the bearings 18^A is enlarged in cross section and oppositely threaded from the center thereof and on each threaded section is mounted a sleeve or traveling nut 18^B. The traveling nuts 18^B are formed with oppositely disposed integral extensions 18^C having stepped ends of decreased diameters 18^D and 18^E respectively. A roller 18^F is mounted on each end 18^E which is supported between the plate 18^G and angle 18^H guides on the channels 13^A.

Elongated saddles 18^J aligned centrally of the carriers 13 are provided which are adapted to engage beneath the vehicle front and rear axles. The saddles 18^J are formed with a slight central depression to accommodate the differential gear casings on the automobiles and have the upper surface preferably provided with rubber covering. The ends thereof have integrally cast cross bearings 18^K for the stub pivots 18^L on which I pivotally mount the arms 18^M, the lower ends of the arms 18^M being pivotally mounted on the ends 18^D.

It will now be readily apparent that when the shaft 18 is rotated in the proper direction the traveling nuts 18^B which are thread mounted on the shaft 18, will, by reason of the threads on the shaft for each nut 18^B being cut oppositely, travel away from each other to cause an upward movement of the upper ends of the arms 18^M to thus lift the saddles 18^J which are hingedly supported on the upper ends of said arms.

To stabilize and guide the movement of the arms 18^M, I provide links 18^N, one end of which is pivotally mounted to the arms 18^M and the other end to the cross members 18^O.

Each carrier 13, is provided on suitable locations of the channels 13^A, with a trolley shoe 19 adapted to ride on the copper contact rail 20.

The contact rail 20 is fixed in a housing 21 of insulated material which is suitably mounted to the angle iron 22.

The trolley shoe 19 is mounted on pins 19^A which are carried in a support 19^B which also carries the coil springs 19^C which exert an upward pressure on the shoe 19. The support 19^B is suitably insulated from the supporting arm 19^D and is provided with an extension 19^E for connection to the electric current conductor 23. Each carrier 13 is provided at both ends with a pair of trolley shoes 19.

It is obvious that various changes or modifications may be made in the construction or arrangement of the apparatus herein shown and described without departing from the spirit of the invention set forth in the appended claims. For instance, the carrier 13 on the elevator could be dispensed with by using the carrier on the transfer table as an elevating unloading device, but in this instance the storage compartments would necessarily be eliminated or the cars could be manually pushed off the elevator into storage on the transfer table.

It is also obvious that the motor vehicles could be handled from the elevator onto the transfer table, from the transfer table into storage, and out of storage into the elevator by simply lifting one end of the motor vehicles; that is, lifting one pair of wheels and dragging the motor vehicle by the carrier on its other pair of wheels. Of course, suitable channel guides would be necessarily provided for the unelevated wheels and these guides would be placed on the elevator, transfer table and storage compartments.

I claim:

1. In a storage system, an inlet, a plurality of stalls, a truck movable adjacent said stalls for conveying an article from said inlet to a desired stall, a carrier movable in said inlet and on said truck, an engaging member on said carrier normally positioned below said article, supporting arms for said engaging member, motor-driven means for propelling said carrier and for raising said supporting arms from a substantially horizontal position to a substantially vertical position to elevate said engaging member and thereby to elevate the article to be stored, and a remote control for said motor-driven means.

2. In a storage system, an inlet, a plurality of stalls, a truck movable adjacent said stalls for conveying an article to a desired stall, a carriage on said truck normally positioned below said article, a worm on said carriage having oppositely threaded portions, travelling members on said worm, supporting arms each having one end pivotally connected to said engaging member and having the other end pivotally connected to one of said travelling members, and remote-controlled motor-driven means for rotating said worm to cause said arms to raise the engaging member to elevate the article to be stored.

3. In a storage system, an inlet, a plurality of stalls, a truck movable adjacent said stalls for conveying an article to a desired stall, a carriage on said truck normally positioned below said article, a worm on said carriage having oppositely threaded portions, travelling members on said worm, supporting arms each having one end pivotally connected to said engaging member and having the other end pivotally connected to one of said travelling members, remote-controlled motor-driven means for rotating said worm to cause said arms to raise the engaging member to elevate the article to be stored, and remote-controlled motor-driven means for moving said carriage to and from said truck and to and from a desired stall.

4. In a vehicle storage system, a plurality of superimposed floors, an elevator adapted to raise a vehicle to a predetermined floor, stalls on said floors, a truck movable from said elevator to said stalls, a movable carriage on said elevator having vehicle lifting means in connection therewith, a similar carriage on said truck, and means on said truck positioned above the truck carriage for receiving said elevator carriage, said elevator carriage being adapted to bodily lift a vehicle, to move said vehicle onto said truck, and to deposit said vehicle in a position where it may be engaged by the lifting mechanism of the truck carriage after the elevator carriage has been withdrawn.

5. In a storage system having an inlet and a plurality of storage stalls, a truck for an article to be stored movable from said inlet and adjacent said stalls, a runway on said truck, a carrier movable on said runway on the truck, an electrical conductor on said runway on the truck for connection with a source of electricity, electric motor means for propelling said carrier, and means on said carrier engaging said conductor, said means being connected with the carrier electric motor to transmit electrical current thereto.

6. In a storage system having an inlet and a plurality of storage stalls, a truck for an article to be stored movable from said inlet and adjacent said stalls, a runway for said truck, an electrical conductor extending along said runway for connection with a source of electricity, electric motor means for propelling said truck, means extending from said truck engaging said conductor, said means being connected with the carrier electric motor to transmit electrical current thereto, a runway on said truck, an electrical conductor extending along said last runway, said conductor being connected with electrical conducting means on the truck, a carrier movable on the runway on the truck, electric motor means for propelling said carrier, and means on the carrier engaging the conductor on the truck, said last means being connected with the carrier electric motor to transmit electrical current thereto.

7. In a garage having a plurality of superposed storage floors, an elevator adapted to raise a vehicle to a predetermined floor, a storage compartment on each of said floors, a movable transfer table on each floor adapted to travel between said elevator and said storage compartment, means normally positioned on said elevator and adapted to lift a vehicle and to move said vehicle onto said transfer table, means for moving said transfer table from said elevator to said storage compartment, and means normally positioned on said transfer table adapted to lift said vehicle and move said vehicle into said storage compartment, said means on said elevator being movable over said means on said transfer table.

8. In a garage having a plurality of superposed storage floors, an elevator adapted to raise a vehicle to a predetermined floor, a storage compartment on each of said floors, a movable transfer table on each floor adapted to travel between said elevator and said storage compartment, means normally positioned on said elevator adapted to bodily lift a vehicle and to move said vehicle onto and from said transfer table, means for moving said transfer table from said elevator to said storage compartment, and separate means normally positioned on said transfer table adapted to bodily lift said vehicle and move said vehicle into and out of said storage compartment, said means on said elevator being movable over said means on said transfer table.

ALFONSE N. BECKER.